United States Patent [19]

Chaloner-Gill

[11] Patent Number: 5,346,787
[45] Date of Patent: Sep. 13, 1994

[54] ALLYL CARBONATE POLYMER SOLID ELECTROLYTES

[75] Inventor: Benjamin Chaloner-Gill, Santa Clara, Calif.

[73] Assignee: Valence Technology, Inc., San Jose, Calif.

[21] Appl. No.: 49,213

[22] Filed: Apr. 19, 1993

[51] Int. Cl.$^5$ .............................................. H01M 6/16
[52] U.S. Cl. .................................. 429/192; 252/62.2; 558/260; 558/266; 429/218; 29/623.1
[58] Field of Search ................ 429/192, 218; 558/260, 558/266; 252/62.2; 29/623.1

[56] References Cited

U.S. PATENT DOCUMENTS 4,737,422  4/1988  Knight et al. ...................... 429/192

OTHER PUBLICATIONS

CA 118(18): 171175v (1991).
CA 118(6): 40118f (1990).

*Primary Examiner*—Prince Willis, Jr.
*Assistant Examiner*—M. Nuzzolillo
*Attorney, Agent, or Firm*—Robert Krebs

[57] ABSTRACT

This invention is directed to novel allyl carbonates and to solid electrolytes containing a solid matrix having incorporated therein allyl carbonates. The solid matrix is used in an electrolytic cell.

17 Claims, No Drawings

ALLYL CARBONATE POLYMER SOLID ELECTROLYTES

BACKGROUND OF THE INVENTION

1. Field of the Invention

This invention is directed to novel allyl carbonate monomers as well as to solid electrolytes derived by polymerization of such allyl carbonate monomers.

2. State of the Art

Electrolytic cells containing an anode, a cathode and a solid, solvent-containing electrolyte are known in the art and are usually referred to as "solid batteries". These cells offer a number of advantages over electrolytic cells containing a liquid electrolyte (i.e., "liquid batteries") including improved safety features.

The solid, solvent-containing electrolyte employed in such solid batteries contains either an inorganic matrix or an organic polymeric matrix as well as a suitable inorganic ion salt. Because of their expense and difficulty in forming into a variety of shapes, inorganic non-polymeric matrices are, however, not preferred and the art typically employs a solid electrolyte containing an organic or inorganic polymeric matrix.

Suitable organic polymeric matrices are well known in the art and are typically organic homopolymers obtained by polymerization of a suitable organic monomer as described, for example, in U.S. Pat. No. 4,908,283 or copolymers obtained by polymerization of a mixture of organic monomers.

Additionally, suitable organic monomers preferably contain at least one heteroatom capable of forming donor acceptor bonds with inorganic cations (e.g., alkali ions). When polymerized, these compounds form a polymer suitable for use an ionically conductive matrix in a solid electrolyte.

The solid electrolytes also contain a solvent (plasticizer) which is added to the matrix primarily in order to enhance the solubility of the inorganic ion salt in the solid electrolyte and thereby increase the conductivity of the electrolytic cell. In this regard, the solvent requirements of the solvent used in the solid electrolyte have been art recognized to be different from the solvent requirements in liquid electrolytes. For example, solid electrolytes require a lower solvent volatility as compared to the solvent volatilities permitted in liquid electrolytes.

Suitable solvents well known in the art for use in such solid electrolytes include, by way of example, propylene carbonate, ethylene carbonate, γ-butyrolactone, tetrahydrofuran, glyme (dimethoxyethane), diglyme, tetraglyme, dimethylsulfoxide, dioxolane, sulfolane and the like.

The solid, solvent-containing electrolyte has typically been formed by one of two methods. In one method, the solid matrix is first formed and then a requisite amount of this material is dissolved in a volatile solvent. Requisite amounts of the inorganic ion salt and the electrolyte solvent (a glyme and the organic carbonate) are then added to the solution. This solution is then placed on the surface of a suitable substrate (e.g., the surface of a cathode) and the volatile solvent is removed to provide for the solid electrolyte.

In the other method, a monomer or partial polymer of the polymeric matrix to be formed is combined with appropriate amounts of the inorganic ion salt and the solvent. This mixture is then placed on the surface of a suitable substrate (e.g., the surface of the cathode) and the monomer is polymerized or cured (or the partial polymer is then further polymerized or cured) by conventional techniques (e.g., heat, ultraviolet radiation, electron beams, etc.) so as to form the solid, solvent-containing electrolyte.

One of the shortcomings of solid batteries has been in the area of cycle life. Cycle life is defined as the time period during which the battery has sufficient discharge capacity. A typical cycle life provides for a slowly decreasing, but still acceptable, discharge capacity for a specified period, followed by a steep drop-off in discharge capacity to below an acceptable minimum.

High capacity batteries provide for higher initial capacity but have acceptable discharge capacity over a corresponding shorter period. In addition, the drop-off in discharge capacity near the end of the cycle life is much steeper.

Thus, the art has been required to choose battery design characteristics which emphasize either higher discharge capacity or longer battery life, but not both. It would therefore be a significant advance in the art to provide a battery design which can provide both a higher discharge capacity and a longer cycle life.

SUMMARY OF THE INVENTION

The present invention is directed, in part, to the use of allyl carbonate monomers which are readily polymerizable and, when polymerized, can be incorporated into an ionically conductive matrix. Batteries incorporating such ionically conductive matrices provide both increased discharge capacity and longer battery life. The allyl carbonate monomers of this invention are represented by Formula I:

$$CH_2=CHCH_2R \qquad I$$

where R is selected from the group consisting of aliphatic carbonates having the Formulae II and III $$-[OC(O)]_aOR_1 \qquad II$$

and $$[OC(O)OR_2]_bOC(O)OR_1 \qquad III$$

where $R_1$ is selected from the group consisting of alkyl of from 1 to 4 carbon atoms and allyl, $R_2$ is an alkylene group of 2 to 4 carbon atoms, a is an integer equal to 1 or 2 and b is an integer from 1 to 4.

When polymerized, these compounds form a polymer suitable for use in an ionically conductive matrix for a solid electrolyte. Accordingly, in another of its composition aspects, this invention is directed to a single phase, solid, solvent- containing electrolyte which comprises:

a solid polymeric matrix;
an inorganic ion salt; and
a solvent;
wherein the solid polymeric matrix is obtained by polymerizing an allyl carbonate monomer represented by Formula I:

$$CH_2=CHCH_2R \qquad I$$

where R is as defined above.

In another of its composition aspects, the present invention is directed to an electrolytic cell which comprises:

an anode comprising a compatible anodic material;

a cathode comprising a compatible cathodic material; and interposed therebetween a single phase, solid, solvent-containing electrolyte which comprises:

a solid polymeric matrix;
an inorganic ion salt; and
a solvent wherein the solid polymeric matrix is obtained by polymerizing an allyl carbonate monomer represented by Formula I:

$$CH_2=CHCH_2R \qquad\qquad I$$

where R is as defined above.

The invention is, in another aspect, directed to a method for producing high discharge capacity and long cycle life, which comprises incorporating into the polymeric matrix of an electrolytic cell an allyl carbonate monomer as defined above.

DETAILED DESCRIPTION OF THE PREFERRED EMBODIMENTS

As noted above, this invention is directed to solid, solvent-containing electrolytes, which employ a specific solid, polymeric, ion-conducting matrix. However, prior to describing this invention in further detail, the following terms will first be defined.

Definitions

As used herein, the following terms have the following meanings.

The term "solid polymeric matrix" refers to an ion-conductive matrix formed by polymerizing an organic monomer containing at least one heteroatom capable of forming donor acceptor bonds with inorganic cations derived from inorganic ion salts under conditions such that the resulting polymer is useful in preparing solid electrolytes. Solid polymeric matrices are well known in the art and are described, for example, in U.S. Pat. No. 4,908,283 and in U.S. Pat. No. 4,925,751 both of which are incorporated herein by reference in their entirety.

Suitable organic monomers include, by way of example, polyethylene oxide, polypropylene oxide, polyethyleneimine, polyepichlorohydrin, polyethylene succinate, urethane acrylate, and an acryloyl-derivatized polyalkylene oxide containing an acryloyl group of the formula $CH_2=CR'C(O)O-$ where R' is hydrogen or lower alkyl of from 1-6 carbon atoms.

The solid polymer matrix of the invention includes repeating units of the allyl carbonates of Formula I together with other comonomers. The solid polymer matrix of the invention can also include cross-links formed by diallyl carbonates and diallyl dicarbonates as described hereinafter, as well as cross-links formed by other polyfunctional monomers, such as propylene triacrylate, etc.

The term "inorganic ion salt" refers to any inorganic salt which is suitable for use in a solid electrolyte. Representative examples are alkali metal salts of less mobile anions of weak bases having a large anionic radius. Examples of such anions are I, Br, SCN, $ClO_4$, $BF_4^-$, $AsF_6^-$, $CF_3COO^-$, $CF_3SO_3^-$, etc. Specific examples of suitable inorganic ion salts include $LiClO_4$, LiI, LiSCN, $LiBF_4$, $LiAsF_6$, $LiCF_3SO_3$, $LiPF_6$, NaI, NaSCN, KI and the like. The inorganic ion salt preferably contains at least one atom selected from the group consisting of Li, Na, K and Mg.

The term "electrolyte solvent" refers to the solvent (i.e., plasticizer) added to the electrolyte and/or the cathode for the purpose of solubilizing the inorganic ion salt. Preferred are the various polar aprotic solvents. Examples of polar aprotic solvents useful in the invention are polar solvents such as propylene carbonate, ethylene carbonate, butylene carbonate, γ-butyrolactone, tetrahydrofuran, 2-methyltetrahydrofuran, 1,3-dioxolane, diglyme, triglyme, tetraglyme, dimethylsulfoxide, sulfolane and the like. A particularly preferred solvent is a mixture of an organic carbonate and triglyme as disclosed in U.S. patent application Ser. No. 07/918,509, filed Jul. 22, 1992, and entitled "SOLID, SOLVENT-CONTAINING ELECTROLYTES AND ELECTROLYTIC CELLS PRODUCED THEREFROM" which application is incorporated herein by reference in its entirety.

If the solid polymeric matrix is formed by radiation polymerization of the monomer of Formula I, then the solvent should be radiation inert at least up to the levels of radiation employed. If the solid polymeric matrix is formed by thermal polymerization, the solvent should be thermally inert at least up to the temperatures of thermal polymerization. Additionally, the solvent should not scavenge free radicals.

The term "cured" or "cured product" refers to the treatment of the monomer of Formula I above (or partial polymer thereof) under polymerization conditions (including cross-linking) so as to form a solid polymeric matrix. Suitable polymerization conditions are well known in the art and include by way of example, heating the monomer, irradiating the monomer with UV light, electron beams, etc. The carbonate in the backbone makes it more compatible with the carbonate based solvent system, or the like. Polymerization control is another advantage. The allyl carbonate monomers of the invention can be random or block copolymerized. Where the monomers of Formula I are block copolymerized with other polymerizable groups, the allylic blocks are small due to their low degree of polymerization. The formation of small blocks in the polymer backbone provides a higher degree of control of polymerization of the overall copolymer.

The monomer of Formula I (or partial polymer thereof) can be cured (or further cured) prior to or after addition of the inorganic ion salt and the electrolyte solvent. For example, a composition comprising requisite amounts of the allyl carbonate monomer, together with one or more comonomers, the inorganic ion salt and the electrolyte solvent, can be applied to a suitable substrate (e.g., the surface of the cathode) and then cured. Alternatively, the monomer of Formula I and comonomer(s) can be first cured and then dissolved in a suitable low volatile solvent. Requisite amounts of the inorganic ion salt and electrolyte solvent can then be added to the solution containing the cured monomer of Formula I (i.e., the solid polymeric matrix). The mixture is then placed on a substrate and removal of the volatile solvent results in formation of a solid electrolyte. In either case, the resulting solid electrolyte is a homogeneous, single phase product which is maintained upon curing, and does not readily separate upon cooling to temperatures below room temperature. Accordingly, the solid electrolyte of this invention does not include a separator as is typical of liquid electrolytes.

The term "electrolytic cell" refers to a composite containing an anode, a cathode, and an ion-conducting electrolyte interposed therebetween.

The anode is typically comprised of a compatible anodic material which is any material which functions as an anode in a solid electrolytic cell. Such compatible anodic materials are well known in the art and include, by way of example, lithium, lithium alloys, such as alloys of lithium with aluminum, mercury, tin, zinc, and the like, and intercalation based anodes such as carbon, tungsten oxides, and the like.

The cathode is typically comprised of a compatible cathodic material (i.e., insertion compounds) which is any material which functions as a positive pole in a solid electrolytic cell. Such compatible cathodic materials are well known in the art and include, by way of example, manganese dioxides, molybdenum oxides, vanadium oxides, sulfides of titanium and niobium, chromium oxides, copper oxides, lithiated cobalt oxides, lithiated manganese oxides, and the like. The particular compatible cathodic material employed is not critical.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a binder, such as a polymeric binder, to form under pressure a positive cathodic plate.

In another preferred embodiment, the cathode is prepared from a cathode paste which comprises from about 35 to 65 weight percent of a compatible cathodic material; from about 1 to 20 weight percent of an electroconductive agent; from about 0 to 20 weight percent of polyethylene oxide having a number average molecular weight of at least 100,000; from about 10 to 50 weight percent of the electrolyte solvent; and from at least about 5 weight percent to 30 weight percent of a solid polymeric matrix which includes repeating units of the monomer of Formula I above. (All weight percents are based on the total weight of the cathode.)

The cathode paste is typically spread onto a suitable support such as a current collector and then cured by conventional methods to provide for a solid positive cathodic plate. The cathode (excluding the support) generally has a thickness of about 20 to about 150 microns.

Current collectors are well known in the art some of which are commercially available. One particularly preferred current collector for the cathode is a roughened nickel (electrolytically deposited nickel) on nickel current collector (available as CF18/NiT from Fukuda Metal Foil & Powder Company, Ltd., Kyoto, Japan). Another preferred current collector is formed from aluminum foil. The current collectors are preferably attached to the surface of the cathode not facing the electrolyte but can also be attached to the anode. When the current collector is attached to the cathode, the cathode is interposed between the electrolyte and the current collector.

In still another preferred embodiment, the electrolyte solvent and the cathode solvent are identical.

The term "urethane acrylate" refers to urethane diacrylate.

Methodology

Methods for preparing solid electrolytes are well known in the art. This invention, however, utilizes a particular monomer in the preparation of solid polymeric matrices used in the solid electrolytes, which monomer is represented by Formula I:

$$CH_2=CHCH_2R$$

where R is as defined above.

The allyl carbonate monomers of Formula I above are readily available from various sources such as Aldrich Chemical Co., Milwaukee, Wis.

The solid, solvent-containing electrolyte is preferably prepared by combining one or more compounds of Formula I with one or more comonomers, an inorganic ion salt and the electrolyte solvent. The resulting composition is then uniformly coated onto a suitable substrate (e.g., aluminum foil, a glass plate, a lithium anode, a cathode, etc.) by means of a roller, a doctor blade, a bar coater, a silk screen or spinner to obtain a film of this composition or its solution. In some cases, it may be necessary to heat the composition so as to provide for a coatable material.

Preferably, the amount of material coated onto the substrate is an amount sufficient so that after curing, the resulting solid, solvent-containing electrolyte has a thickness of no more than about 250 microns ($\mu m$). Preferably, the solid, solvent-containing electrolyte has a thickness of from about 20 to about 100 microns. The actual thickness chosen is a function of the particular application and can readily be determined by one skilled in the art.

The electrolyte composition typically comprises from about 5 to about 25 weight percent of an inorganic ion salt based on the total weight of the electrolyte; preferably, from about 10 to 20 weight percent, and even more preferably about 15 weight percent.

The electrolyte composition also typically includes from about 40 to about 80 weight percent solvent based on the total weight of the electrolyte, preferably from about 60 to about 80 weight percent, and even more preferably about 70 weight percent.

The solid electrolyte composition typically comprises from about 5 to less than about 30 weight percent (e.g., 29 weight percent) of the polymer derived from a compound of Formula I based on the total weight of the electrolyte, preferably from about 15 to about 25 weight percent. An especially preferred embodiment uses about 17 percent by weight of the compound of Formula I.

The solid polymeric matrix including the allyl carbonate repeating units can be a random or block copolymer. Formation of blocks of the allyl carbonate involves the formation of allyl dimers, trimers, tetramers, etc. prior to copolymerization with the other organic monomer or monomers.

In a preferred embodiment, the electrolyte composition further comprises a small amount of a film forming agent. Suitable film forming agents are well known in the art and include, by way of example, polypropylene oxide, polyethylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

The composition is cured by conventional methods to form a solid film. For example, suitable curing methods include heating, irradiation with UV radiation, irradiation with electron beams (EB), etc. When the composition is cured by heating or UV radiation, the composition preferably contains an initiator. For example, when curing is by heating, the initiator is typically a peroxide such as benzoyl peroxide, methyl ethyl ketone peroxide, t-butyl peroxypyvarate, diisopropyl peroxycarbonate, and the like. When curing is by UV radiation, the initiator is typically benzophenone, Darocur 1173 (Ciby Geigy, Ardsley, N.Y.), and the like.

The initiator is generally employed in an amount sufficient to catalyze the polymerization reaction. Preferably, the initiator is employed at up to about 1 weight percent based on the weight of the solid matrix forming monomer.

When curing is by EB treatment, an initiator is not required.

The resulting solid electrolyte is a homogeneous, single phase material which is maintained upon curing, and which does not readily separate upon cooling to temperatures below room temperature. See, for example, U.S. Pat. No. 4,925,751.

Additionally, it is desirable to avoid the use of any protic materials which will be incorporated into the battery. For example, most of the protic inhibitors for preventing premature monomer polymerization (e.g., protic inhibitors found in di- and triacrylate monomers) employed with the monomers are preferably removed prior to formation of the solid matrix (e.g., the cathode and/or electrolyte) by contact with a inhibitor remover such as Inhibitor Remover available as product number 31,133-2 from Aldrich Chemical, Milwaukee, Wisc. Such processes generally will lower the inhibitor concentration to less than about 50 ppm.

In a preferred embodiment, the process of forming an electrolytic cell comprises the steps of coating the surface of a cathode with a composition comprising requisite amounts of one or more monomers of Formula I with one or more comonomers, an inorganic ion salt and the electrolyte solvent. The composition is then cured to provide for a solid electrolyte on the cathodic surface. The anode (e.g., a lithium foil) is then laminated to this composite product in such a way that the solid electrolyte is interposed between the lithium foil and the cathodic material.

This process can be reversed so that the surface of an anode is coated with a composition comprising one or more compounds of Formula I, one or more comonomers, an inorganic ion salt and the electrolyte solvent. The composition is then cured to provide for a solid electrolyte on the anodic surface. The cathode is then laminated to this composite product in such a way that the solid electrolyte is interposed between the lithium foil and the cathodic material.

Methods for preparing solid electrolytes and electrolytic cells are also set forth in U.S. Pat. Nos. 4,925,751 and 4,830,939, the latter of which is also incorporated herein by reference in its entirety.

The following examples are offered to illustrate the present invention and should not be construed in any way as limiting its scope.

EXAMPLE 1

A solid electrolytic cell is prepared by first preparing a cathodic paste which is spread onto a current collector and is then cured to provide for the cathode. An electrolyte solution is then placed onto the cathode surface and is cured to provide for the solid electrolyte composition. Then, the anode is laminated onto the solid electrolyte composition to provide for a solid electrolytic cell. The specifics of this construction are as follows:

A. The Current Collector

The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween.

Specifically, the adhesion promoter layer is prepared as a dispersed colloidal solution in one of two methods. The first preparation of this colloidal solution for this example is as follows:

84.4 weight percent of carbon powder (Shawinigan Black ®—available from Chevron Chemical Company, San Ramon, Calif.)

337.6 weight percent of a 25 weight percent solution of polyacrylic acid (a reported average molecular weight of about 90,000, commercially available from Aldrich Chemical Company—contains about 84.4 grams polyacrylic acid and 253.2 grams water)

578.0 weight percent of isopropanol

The carbon powder and isopropanol are combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid is added to the solution and mixed for approximately 15 minutes. The resulting mixture is pumped to the coating head and roll coated with a Meyer rod onto a sheet of aluminum foil (about 9 inches wide and about 0.0005 inches thick). After application, the solution/foil are contacted with a Mylar wipe (about 0,002 inches thick by about 2 inches and by about 9 inches wide—the entire width of aluminum foil). The wipe is flexibly engaged with the foil (i.e., the wipe merely contacts the foil) to redistribute the solution so as to provide for a substantially uniform coating. Evaporation of the solvents (i.e., water and isopropanol) via a conventional gas-fired oven provides for an electrically-conducting adhesion-promoter layer of about 6 microns in thickness or about $3 \times 10^{-4}$ grams per $cm^2$. The aluminum foil is then cut to about 8 inches wide by removing approximately ½ inch from either side by the use of a conventional slitter so as to remove any uneven edges.

In order to further remove the protic solvent from this layer, the foil is redried. In particular, the foil is wound up and a copper support placed through the roll's cavity. The roll is then hung overnight from the support in a vacuum oven maintained at about 130° C. Afterwards, the roll is removed. In order to avoid absorption of moisture from the atmosphere, the roll is preferably stored into a desiccator or other similar anhydrous environment to minimize atmospheric moisture content until the cathode paste is ready for application onto this roll.

The second preparation of this colloidal solution comprises mixing 25 lbs of carbon powder (Shawinigan Black ®—available from Chevron Chemical Company, San Ramon, Calif.) with 100 lbs of a 25 weight percent solution of polyacrylic acid (average molecular weight of about 240,000, commercially available from BF Goodrich, Cleveland, Ohio, as Good-Rite K702—contains about 25 lbs polyacrylic acid and 75 lbs water) and with 18.5 lbs of isopropanol. Stirring is done in a 30 gallon polyethylene drum with a gear-motor mixer (e.g., Lightin Labmaster Mixer, model XJ-43, available from Cole-Parmer Instruments Co., Niles, Ill.) at 720 rpm with two 5 inch diameter A310-type propellers mounted on a single shaft. This wets down the carbon and eliminates any further dust problem. The resulting weight of the mixture is 143.5 lbs and contains some "lumps".

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 $\mu$m with the occasional 12.5 $\mu$m particles. The mixture can be stored for well over 1 month without the carbon settling out or reagglomerating.

When this composition is to be used to coat the current collector, an additional 55.5 lbs of isopropanol is mixed into the composition working with 5 gallon batches in a plastic pail using an air powered shaft mixer (Dayton model 42231 available from Granger Supply Co., San Jose, CA) with a 4 inch diameter Jiffy-Mixer brand impeller (such as an impeller available as Catalog No. G-04541-20 from Cole Parmer Instrument Co., Niles, Ill.). Then, it is gear pumped through a 25 $\mu$m cloth filter (e.g., So-Clean Filter Systems, American Felt and Filter Company, Newburgh, N.Y.) and Meyer-rod coated as described above.

B. The Cathode

The cathode is prepared from a cathodic paste which, in turn, is prepared from a cathode powder as follows:

i. Cathode Powder

The cathode powder is prepared by combining 90.44 weight percent $V_6O_{13}$ [prepared by heating ammonium metavanadate ($NH_4^+VO_3^-$) at 450° C. for 16 hours under $N_2$ flow] and 9.56 weight percent of carbon (from Chevron Chemical Company, San Ramon, Calif. under the tradename of Shawinigan Black ®). About 100 grams of the resulting mixture is placed into a grinding machine (Attritor Model S-1 purchased from Union Process, Akron, Ohio) and ground for 30 minutes. Afterwards, the resulting mixture is dried at about 260° C. for 21 hours.

ii. Cathode Paste

A cathode paste is prepared by combining sufficient cathode powder to provide for a final product having 45 weight percent $V_6O_{13}$.

Specifically, 171.6 grams of a 4:1 weight ratio of propylene carbonate:triglyme is combined with 42.9 grams of polyethylene glycol diacrylate (molecular weight about 400 available as SR-344 from Sartomer Company, Inc., Exton, Pa.), and about 7.6 grams of ethoxylated trimethylpropane triacrylate (TMPEOTA) (molecular weight about 450 available as SR-454 from Sartomer Company, Inc., Exton, PA) in a double planetary mixer (Ross #2 mixer available from Charles Ross & Sons, Company, Hauppag, N.Y.).

A propeller mixture is inserted into the double planetary mixer and the resulting mixture is stirred at a 150 rpms until homogeneous. The resulting solution is then passed through sodiated 4Å molecular sieves. The solution is then returned to double planetary mixer equipped with the propeller mixer and about 5 grams of polyethylene oxide (number average molecular weight about 600,000 available as Polyox WSR-205 from Union Carbide Chemicals and Plastics, Danbury, Conn.) is added to the solution vortex from by the propeller by a mini-sieve such as a 25 mesh mini-sieve commercially available as Order No. 57333-965 from VWR Scientific, San Francisco, Calif.

The solution is then heated while stirring until the temperature of the solution reaches 65° C. At this point, stirring is continued until the solution is completely clear. The propeller blade is removed and the carbon powder prepared as above is then is added as well as an additional 28.71 grams of unground carbon (from Chevron Chemical Company, San Ramon, Calif. under the tradename of Shawinigan Black ®). The resulting mixture is mixed at a rate of 7.5 cycles per second for 30 minutes in the double planetary mixer. During this mixing the temperature is slowly increased to a maximum of 73° C. At this point, the mixing is reduced to 1 cycle per second the mixture slowly cooled to 40° C. to 48° C. (e.g. about 45° C.). The resulting cathode paste is maintained at this temperature until just prior to application onto the current collector.

The resulting cathode paste has the following approximate weight percent of components:

| | |
|---|---|
| $V_6O_{13}$ | 45 weight percent |
| Carbon | 10 weight percent |
| 4:1 Propylene carbonate/triglyme | 34 weight percent |
| Polyethylene oxide | 1 weight percent |
| Polyethylene glycol diacrylate | 8.5 weight percent |
| Ethoxylated trimethylpropane triacrylate | 1.5 weight percent. |

In an alternative embodiment, the requisite amounts of all of the solid components are added to directly to combined liquid components. In this regard, mixing speeds can be adjusted to account for the amount of the material mixed and size of vessel used to prepare the cathode paste. Such adjustments are well known to the skilled artisan.

In order to enhance the coatability of the carbon paste onto the current collector, it may be desirable to heat the paste to a temperature of from about 60° C. to about 130° C. and more preferably, from about 80° C. to about 90° C. and for a period of time of from about 0.1 to about 2 hours, more preferably, from about 0.1 to 1 hour and even more preferably from about 0.2 to 1 hour. A particularly preferred combination is to heat the paste at from about 80° C. to about 90° C. for about 0.33 to about 0.5 hours.

During this heating step, there is no need to stir or mix the paste although such stirring or mixing may be conducted during this step. However, the only requirement is that the composition be heated during this period. In this regard, the composition to be heated has a volume to surface area ratio such that the entire mass is heated during the heating step.

A further description of this heating step is set forth in U.S. patent application Ser. No. 07/968,203 filed Oct. 29, 1992, and entitled "METHODS FOR ENHANCING THE COATABILITY OF CARBON PASTES TO SUBSTRATES", which application is incorporated herein by reference in its entirety.

The so-prepared cathode paste is then placed onto the adhesion layer of the current collector described above by extrusion at a temperature of from about 45° to about 48° C. A Mylar cover sheet is then placed over the paste and the paste is spread to thickness of about 90 microns (μm) with a conventional plate and roller system and is cured by continuously passing the sheet through an electron beam apparatus (Electrocurtain, Energy Science Inc., Woburn, Mass.) at a voltage of about 175 kV and a current of about 1.0 mA and at a rate of about 1 cm/sec. After curing, the Mylar sheet is removed to provide for a solid cathode laminated to the aluminum current collector described above.

C. Electrolyte 56.51 grams of propylene carbonate, 7.56 grams of allyl methyl carbonate, 14.13 grams of triglyme, and 10.00 grams of urethane acrylate (Photomer 6140, available from Henkel Corp., Coating and Chemical Division, Ambler, Pa.) are combined at room temperature until homogeneous. The resulting solution is passed through a column of 4Å sodiated molecular sieves to remove water and then mixed at room temperature until homogeneous.

At this point, 2.57 grams of polyethylene oxide film forming agent having a number average molecular weight of about 600,000 (available as Polyox WSR-205 from Union Carbide Chemicals and Plastics, Danbury, Conn.) is added to the solution and then dispersed while stirring with a magnetic stirrer over a period of about 120 minutes. After dispersion, the solution is heated to between 60° C. and 65° C. with stirring until the film forming agent dissolved. The solution is cooled to a temperature of between 45° and 48° C., a thermocouple is placed at the edge of the vortex created by the 35 magnetic stirrer to monitor solution temperature, and then 9.24 grams of $LiPF_6$ are added to the solution over a 120 minute period while thoroughly mixing to ensure a substantially uniform temperature profile throughout the solution. Cooling is applied as necessary to maintain the temperature of the solution between 45° and 48° C.

In one embodiment, the polyethylene oxide film forming agent is added to the solution via a mini-sieve such as a 25 mesh mini-sieve commercially available as Order No. 57333-965 from VWR Scientific, San Francisco, Calif.

The resulting solution contains the following:

| Component | Amount | Weight Percent[1] |
|---|---|---|
| Propylene carbonate | 56.51 g | 56.51 |
| Allyl methyl carbonate | 7.56 g | 7.56 |
| Triglyme | 14.13 g | 14.13 |
| Urethane acrylate | 10.00 g | 10.00 |
| $LiPF_6$ | 9.24 g | 9.24 |
| PEO film forming agent | 2.57 g | 2.57 |
| Total | 100 g | 100 |

This solution is then degassed to provide for an electrolyte solution wherein little, if any, of the $LiPF_6$ salt decomposes.

Optionally, solutions produced as above and which contain the prepolymer, the allyl methyl carbonate, the polyalkylene oxide film forming agent, the electrolyte solvent and the $LiPF_6$ salt are filtered to remove any solid particles or gels remaining in the solution. One suitable filter device is a sintered stainless steel

[1] = weight percent based on the total weight of the electrolyte solution (100 g) screen having a pore size between 1 and 50 μm at 100% efficiency.

Alternatively, the electrolyte solution can be prepared in the following manner. Specifically, in this example, the mixing procedure is conducted using the following weight percent of components:

| Propylene carbonate | 52.472 weight percent |
|---|---|
| Allyl methyl carbonate | 7.379 weight percent |
| Triglyme | 13.099 weight percent |
| Urethane acrylate[2] | 13.000 weight percent |
| $LiPF_6$ | 10.720 weight percent |
| PEO film forming agent[3] | 3.340 weight percent |

The mixing procedure employs the following steps:

1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over sodiated 4Å molecular sieves (Grade 514, 8-12 Mesh from Schools Inc., Moraga, Calif.). Add the allyl methyl carbonate to the mixture and then proceed to step 4.

2. Dry the propylene carbonate and triglyme over sodiated 4Å molecular sieves (Grade 514, 8-12 Mesh from Schoofs Inc., Moraga, Calif.).

[2] (Photomer 6140, available from Henkel Corp., Coating and Chemical Division, Ambler, Pa.)
[3] Polyethylene oxide film forming agent having a number average molecular weight of about 600,000 (available as Polyox WSR-205 from Union Carbide Chemicals and Plastics, Danbury, Conn.)

3. At room temperature, <30° C., add the urethane acrylate and the allyl methyl carbonate to the solvent prepared in step 2. Stir at 300 rpm until the resin is completely dissolved. The solution should be clear and colorless.

4. Dry and then sift the polyethylene oxide film forming agent through a 25 mesh mini-sieve commercially available as Order No. 57333-965 from VWR Scientific, San Francisco, Calif. While stirring at 300 rpm, add the dried and pre-sifted polyethylene oxide film forming agent slowing to the solution. The polyethylene oxide film forming agent should be sifted into the center of the vortex formed by the stirring means over a 30 minute period. Addition of the polyethylene oxide film forming agent should be dispersive and, during addition, the temperature should be maintained at room temperature (<30° C.).

5. After final addition of the polyethylene oxide film forming agent, stir an additional 30 minutes to ensure that the film forming agent is substantially dispersed.

6. Heat the mixture to 68° C. to 75° C. and stir until the film forming agent has melted and the solution has become transparent to light yellow in color. Optionally, in this step, the mixture is heated to 65° C. to 68° C.

7. Cool the solution produced in step 6 and when the temperature of the solution reaches 40° C., add the $LiPF_6$ salt very slowly making sure that the maximum temperature does not exceed 55° C.

8. After the final addition of the LiPF6 salt, stir for an additional 30 minutes, degas, and let sit overnight and cool.

9. Filter the solution through a sintered stainless steel screen having a pore size between 1 and 50 μm at 100% efficiency.

At all times, the temperature of the solution should be monitored with a thermocouple which should be placed in the vortex formed by the mixer.

Afterwards, the electrolyte mixture is then coated by a conventional knife blade to a thickness of about 50 μm onto the surface of the cathode sheet prepared as above (on the side opposite that of the current collector) but without the Mylar covering. The electrolyte is then cured by continuously passing the sheet through an electron beam apparatus (Electrocurtain, Energy Science Inc., Woburn, Mass.) at a voltage of about 175 kV and a current of about 1.0 mA and at a conveyor speed setting of 50 which provides for a conveyor speed of about 1 cm/sec. After curing, a composite is recovered which contained a solid electrolyte laminated to a solid cathode.

D. Anode

The anode comprises a sheet of lithium foil (about 76 μm thick) which is commercially available from FMC Corporation Lithium Division, Bessemer City, N.C.

E. The Solid Electrolytic Cell

A sheet comprising a solid battery is prepared by laminating the lithium foil anode to the surface of the electrolyte in the sheet produced in step C above. Lamination is accomplished by minimal pressure.

EXAMPLE 2

A. The Cathode

A cathode was prepared from a cathodic paste which, in turn, was prepared from a cathode powder as follows:

i. Cathode Powder

The cathode powder was prepared by combining 90.44 weight percent $V_6O_{13}$ [prepared by heating ammonium metavanadate ($NH_4^+ VO_3^-$) at 450° C. for 16 hours under $N_2$ flow] and 9.56 weight percent of carbon (from Chevron Chemical Company, San Ramon, Calif. under the trade name of Shawinigan Black®). About 100 grams of the resulting mixture was placed into a grinding machine (Attritor Model S-1 purchased from Union Process, Akron, Ohio) and ground for 45 minutes. Afterwards, the resulting mixture was dried at about 260° C. for 16 hours under vacuum to provide a cathode powder having about 84.45 weight percent $V_6O_{13}$.

The above mixing procedure was repeated until the entire sample was mixed so as to provide for 292 grams of cathode powder.

ii. Cathode Paste

A cathode paste was prepared by combining sufficient cathode powder to provide for a final product having 45 weight percent $V_6O_{13}$.

Specifically, about 26.2 grams of unground carbon (from Chevron Chemical Company, San Ramon, Calif. under the trade name of Shawinigan Black®) was combined in a glove box [under dry (<10 ppm $H_2O$) argon at ambient temperature and pressure] with about 169.9 grams of the 4:1 mixture of propylene carbonate/triglyme and the resulting composite was mixed under dry argon and at ambient temperature and pressure on a double planatory mixer (Ross #2 mixer available from Charles Ross & Sons, Company, Hauppag, N.Y.) at about 25 rpms until a paste was formed.

About 225.0 grams of a cathode powder prepared in a manner similar to that described above was added to the mixer and the resulting composite was mixed under dry argon and at ambient temperature and pressure on a double planatory mixer at about 25 rpms until a dry paste was formed.

About 5 grams of polyethylene oxide (number average molecular weight about 600,000 available as Polyox WSR-205 from Union Carbide Chemicals and Plastics, Danbury, Conn.), about 42.5 grams of polyethylene glycol diacrylate (molecular weight about 400 available as SR-344 from Sartomer Company, Inc., Exton, Pa.) and containing less than about 50 ppm of inhibitor, and about 7.5 grams of ethoxylated trimethylpropane triacrylate (TMPEOTA) (molecular weight about 450, available as SR-454 from Sartomer Company, Inc., Exton, Pa.) and containing less than about 50 ppm of inhibitor are added to about 169.9 grams of a 4:1 mixture of propylene carbonate/triglyme as described above, and this mixture then added to the mixer.

The resulting slurry in the mixer was heated at about 65° C. while mixing for 2 hours at 60 rpms to provide for the cathodic paste which had the following approximate weight percent of components:

| | |
|---|---|
| $V_6O_{13}$ | 45.00 weight percent |
| Carbon | 10.00 weight percent |
| Propylene carbonate | 27.18 weight percent |
| Triglyme | 6.80 weight percent |
| Polyethylene glycol diacrylate | 8.51 weight percent |
| Ethoxylated trimethylpropane triacrylate[4] | 1.51 weight percent |
| Polyethylene oxide | 1.00 weight percent. |

The cathode paste prepared as above was placed onto a sheet [about 1 mil ($\approx$25 μm) thick by 10 cm wide] of aluminum foil with a carbon polyacrylic coating as described in Example 1. A Mylar cover sheet was then placed over the paste and the paste was spread to a thickness of about 75 μm with a conventional plate and roller system and cured by continuously passing the sheet through an electron beam apparatus (Electrocurtain, Energy Science Inc., Woburn, Mass.) at a voltage of about 175 kV and a current of about 12 mA and at a conveyor belt speed setting of 50 which provides a conveyor speed of about 3 in/sec. After curing, the Mylar sheet was removed to provide for a solid cathode laminated to an aluminum current collector.

B. Electrolyte

[4] Inhibitor was removed from both the polyethylene glycol diacrylate and ethoxylated trimethylpropane triacrylate by contacting each of these compounds with Inhibitor Remover available as Product No. 31,133-2 from Aldrich Chemical, Milwaukee, Wisc., which resulted in less than 50 ppm of inhibitor in the product.

An electrolyte was prepared by first combining 46.03 grams of propylene carbonate, 11.01 grams triglyme and 17.1 grams of urethane acrylate (available as Photomer 6140 from Henkel Corporation, Coating and Chemicals Division, Ambler, Pa.). The propylene carbonate/triglyme/urethane acrylate mixture was dried over molecular sieves (Grade 514, 4Å, 8–12 mesh, available from W. R. Grace, Baltimore, Md.) to remove water.

This solution was then combined with 2.50 grams of poly- ethylene oxide (weight average molecular weight about 600,000 available as Polyox WSR-205 from Union Carbide Chemicals and Plastics, Danbury, Conn.) and 13.76 grams of allyl methyl carbonate.

The mixture was then thoroughly mixed with the same laboratory mixer at heating until a temperature of about 65° C. was reached and then cooled to 50° C. while maintaining stirring.

Once the polyethylene oxide was dispersed and dissolved, 11.60 grams of $LiAsF_6$ (available from FMC Corporation, Lithium Division, Bessemer City, N.C.) were added while stirring with a laboratory mixer (Yamato Model LR41B, available from Fisher Scientific, Santa Clara, Calif.).

The resulting mixture contained the weight percent of components set forth in the Table below.

Afterwards, the electrolyte mixture was then coated by a conventional knife blade to a thickness of about 50

μm onto the surface of the cathode sheet prepared as above (on the side opposite that of the current collector) but without the Mylar covering. The electrolyte was then cured by continuously passing the sheet through an electron beam apparatus (Electrocurtain, Energy Science Inc., Woburn, Mass.) at a voltage of about 1.75 kV and a current of about 1.0 mA and at a conveyor speed setting of 50 which provided for a conveyor speed of about 1 cm/sec. After curing, a composite was recovered which contained a solid electrolyte laminated to a solid cathode which, in turn, was laminated to a nickel on nickel current collector.

C. Anode

The anode comprised a sheet of lithium foil (about 76 μm thick) which is commercially available from FMC Corporation Lithium Division, Bessemer City, N.C.

D. The Solid Battery

A solid battery was prepared by first preparing a cathodic paste as described above which was spread onto a substrate (e.g., a current collector) and then cured to provide the cathode. An electrolyte composition as described above was then placed onto the cathode surface and cured to provide for the solid electrolyte. Then, the anode was laminated onto the solid electrolyte to provide for the solid battery.

The resulting battery was then tested for cycle life. Cycle life is defined as the number of cycles (discharge and charge) that occurred before the cell reached half of its initial capacity. For example, if the initial amp hours were 0.05, when the cell reached 0.025 it was considered "dead". The results are summarized in the Table below.

EXAMPLES 3 AND 4

Batteries were prepared in a manner similar to Example 2 except that the electrolyte formulations summarized in the Table were used. Cycle life for these batteries was also determined and is listed in the following Table.

TABLE

| | Example No. | | |
|---|---|---|---|
| | 2 | 3 | 4 |
| Formulation | | | |
| Propylene carbonate | 44.03 | 44.03 | 33.50 |
| Triglyme | 11.01 | 11.01 | 11.00 |
| Urethane diacrylate (Photomer 6140) | 17.1 | 13.76 | 13.76 |
| LiAsF$_6$ | 11.60 | 11.60 | 0 |
| LiPF$_6$ | 0 | 0 | 9.24 |
| Allyl methyl carbonate | 13.76 | 17.1 | 30.00 |
| Polyethylene oxide | 2.50 | 2.50 | 2.50 |
| Cycle Life | 91 | 95 | 4 |

The difference in cycle life of Example 4 versus that of Examples 2 and 3, is due to the too high concentration of allyl methyl carbonate. Since allylic based polymers yield a soft material (due to the low degree of polymerization, x=10-11, where x is the chain length), the electrolyte was inadequate in performance. Examples 2 and 3 gave very good results.

What is claimed is:

1. A single phase, solid, solvent- containing electrolyte which comprises:
   a solid polymeric matrix;
   an inorganic ion salt; and
   a solvent;
   wherein said solid polymeric matrix is obtained by polymerizing an allyl carbonate monomer represented by Formula I:

$$CH_2=CHCH_2R \qquad I$$

where R is selected from the group consisting of aliphatic carbonates having the Formulae II and III:

$$-[OC(O)]_aOR_1 \qquad II$$

and $$[OC(O)OR_2]_bOC(O)OR_1 \qquad III$$

where R$_1$ is independently selected from the group consisting of alkyl of from 1 to 4 carbon atoms, and allyl, R$_2$ is an alkylene group of 2 to 4 carbon atoms, a is an integer of 1 or 2, and b is an integer from 1 to 4.

2. An electrolyte according to claim 1, wherein the allyl carbonate monomer is allyl methyl carbonate.

3. An electrolyte according to claim 1, wherein the inorganic ion salt is LiAsF$_6$.

4. An electrolyte according to claim 1, wherein the inorganic ion salt is LiPF6.

5. An electrolyte according to claim 1, wherein the solid polymeric matrix comprises repeating units of urethane acrylate and allyl methyl carbonate.

6. An electrolytic cell which comprises:
   an anode
   a cathode; and
   interposed therebetween a single phase, solid, solvent-containing electrolyte which comprises:
   a solid polymeric matrix;
   an inorganic ion salt; and
   a solvent
   wherein said solid polymeric matrix is obtained by polymerizing an organic monomer represented by Formula I:

$$CH_2=CHCH_2R \qquad I$$

where R is selected from the group consisting of aliphatic carbonates having the Formulae II and III $$-[OC(O)]_aOR_1 \qquad II$$

and $$[OC(O)OR_2]_bOC(O)OR_1 \qquad III$$

where each R$_l$ is independently selected from the group consisting of alkyl of from 1 to 4 carbon atoms, and allyl, R$_2$ is an alkylene group of 2 to 4 carbon atoms, a is an integer of 1 or 2, and b is an integer from 1 to 4.

7. An electrolytic cell according to claim 6, wherein the allyl carbonate monomer comprises allyl methyl carbonate.

8. An electrolytic cell according to claim 6, wherein the inorganic ion salt is LiAsF$_6$.

9. An electrolytic cell according to claim 6, wherein the inorganic ion salt is LiPF$_6$.

10. An electrolytic cell according to claim 6, wherein the solid polymeric matrix comprises repeating units of urethane acrylate and allyl methyl carbonate.

11. A method for producing an electrolytic cell comprising the steps of:
    (a) selecting an anode;

(b) selecting a cathode having a,
(c) subjecting to polymerization conditions a mixture comprising an allyl carbonate represented by Formula I, an inorganic ion salt, and a solvent to form a single-phase, solid, solvent-containing electrolyte; and
(d) interposing said electrolyte between said anode and said cathode;
wherein Formula I is $$CH_2=CHCH_2R \qquad \text{I}$$

where R is selected from the group consisting of aliphatic carbonates having the Formulae II and III, $$-[OC(O)]_aOR_1 \qquad \text{II}$$

and $$-[OC(O)OR_2]_bOC(O)OR_1 \qquad \text{III}$$

where $R_1$ is independently selected from the group consisting of alkyl of from 1 to 4 carbon atoms, and allyl, $R_2$ is an alkylene group of 2 to 4 carbon atoms, a is 1 or 2, and b is an integer from 1 to 4.

12. A method according to claim 11, wherein the allyl carbonate monomer comprises allyl methyl carbonate.

13. A method according to claim 11, wherein the inorganic ion salt is $LiAsF_6$.

14. A method according to claim 11, wherein the inorganic ion salt is $LiPF_6$.

15. A method according to claim 11, wherein the solid polymeric matrix comprises repeating units of urethane acrylate and allyl methyl carbonate.

16. A method according to claim 11, wherein the repeating units formed from the allyl carbonate monomer comprises less than about 30 weight percent of the electrolyte.

17. A method according to claim 11, wherein repeating units formed from the allyl carbonate comprise from about 15 to about 25 weight percent of the electrolyte.

* * * * *